April 7, 1936.  F. A. STEVENS  2,036,551

OPHTHALMIC MOUNTING AND METHOD

Filed June 28, 1934  2 Sheets-Sheet 1

Inventor
Frederick A. Stevens
by David Rines
Attorney

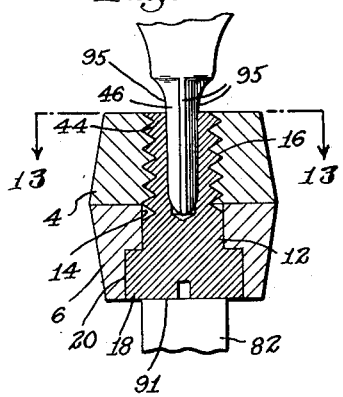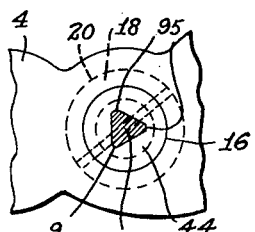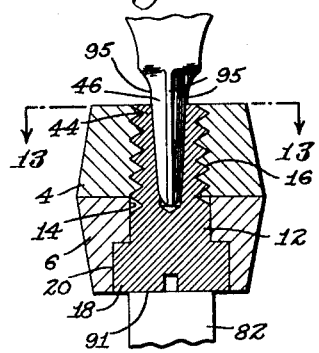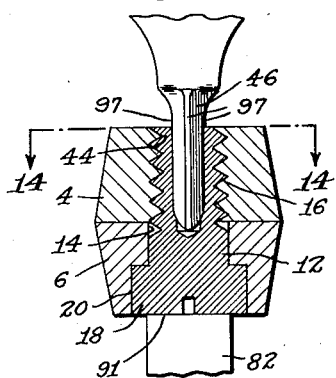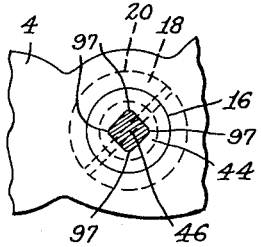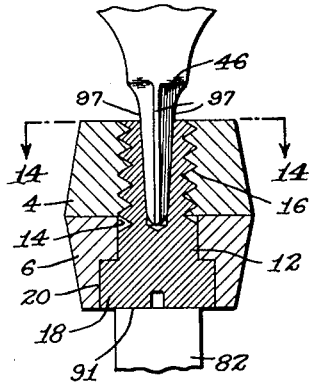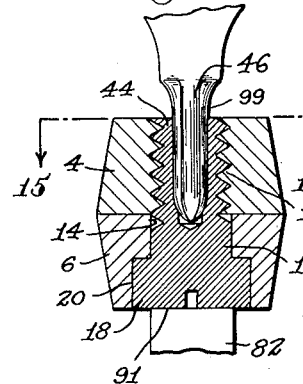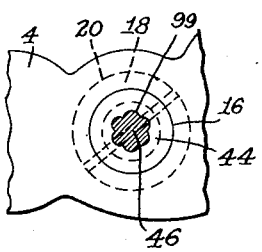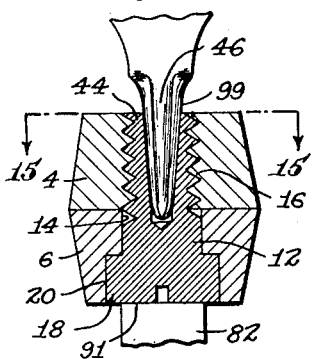

Patented Apr. 7, 1936

2,036,551

UNITED STATES PATENT OFFICE 2,036,551

OPHTHALMIC MOUNTING AND METHOD

Frederick Arthur Stevens, Providence, R. I.

Application June 28, 1934, Serial No. 732,786

6 Claims. (Cl. 29—20)

The present invention relates to ophthalmic mountings and parts thereof and to methods of making the same. Certain features of the invention are, however, of more general utility.

Parts of ophthalmic mountings, and other devices that are similarly held together, have a tendency to separate, because the screws do not hold tight. According to the inventions disclosed in applications Serial No. 683,323, filed August 2, 1933, and Serial No. 722,092, filed April 24, 1934, minute, threaded, light, metal parts, having very few threads, such as is the case with the screws and dowels used in the manufacture and maintenance of ophthalmic mountings and similar articles, are assembled and locked in position in a very effective manner.

A chief object of the invention is to improve upon the methods described in the said applications.

Further objects are to provide flexibility of locking control under the dimensional variations encountered in new and repair work; and to compensate for differences of uniformity and standard shapes and structures of the threaded members, so as to obtain a uniform locking effect irrespective of such differences.

Other and further objects of the invention will be explained hereinafter, and will be more particularly pointed out in the appended claims.

Figure 1:
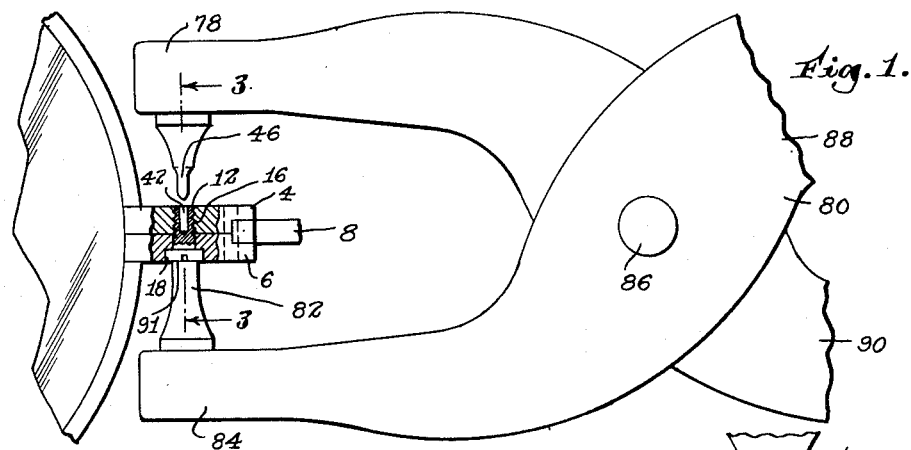
Figure 2:
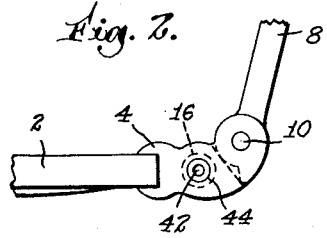
Figure 4:
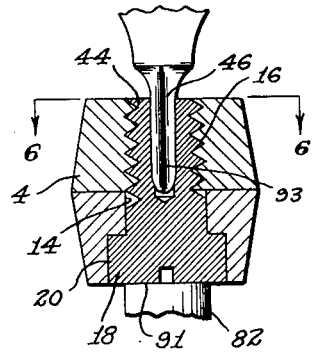
Figure 3:
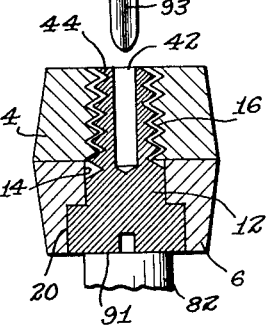
Figure 5:
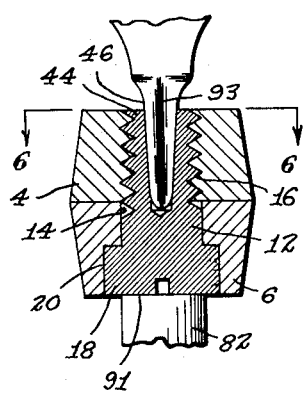
Figure 6:
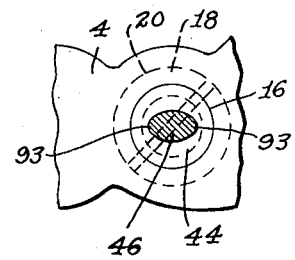
Figure 16:
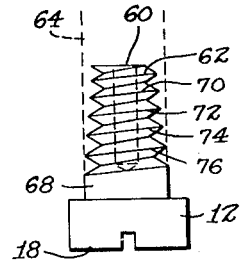

The invention will be described in connection with the accompanying drawings, in which Fig. 1 is an elevation, partly in section, illustrating a step in the novel method of the present invention; Fig. 2 is a plan of the pair of spectacles illustrated in Fig. 1; Fig. 3 is an enlarged section, taken upon the line 3—3 of Fig. 1, looking in the direction of the arrows; Fig. 4 is a similar section, illustrating a further step in the novel method of the present invention; Fig. 5 is a section, similar to Fig. 4, of a modification; Fig. 6 is a section taken upon the line 6—6 of Fig. 4 or Fig. 5; Figs. 7, 8 and 9 are views, similar to Fig. 4, of further modifications; Figs. 10, 11 and 12 are views bearing the same relation to Figs. 7, 8 and 9, respectively, that Fig. 5 bears to Fig. 4; Figs. 13, 14 and 15 are sections taken, respectively, upon the lines 13—13 of Fig. 9 or Fig. 10, the line 14—14 of Fig. 8 or Fig. 11 and the line 15—15 of Fig. 9 or Fig. 12; and Fig. 16 is an enlarged elevation of the screw illustrated in Figs. 1 to 6 before it is longitudinally apertured.

Errors of human vision may be corrected by properly prescribed lenses, mounted in fittings, mostly of metal, and held together by very small screws. One of these fittings is shown as a lens-holding, metal rim 2 of a pair of spectacles, having metal end pieces 4 and 6 between which swings a temple 8 upon a dowel 10. The end pieces 4 and 6 are usually held together by one of the said very small screws, shown as an externally threaded, cylindrical, metal screw 12 disposed loosely in a cylindrical opening 14 of the the end piece 6 and threaded into an internally threaded, cylindrical opening 16 in the end piece 4. The head 18 of the screw 12 is seated in a countersink 20 of the end piece 6. These fittings must be adjusted accurately to conform to the facial and visual requirements of each case; and when once fitted, it is highly important that the lenses shall remain in the prescribed positions. As the screws 12 have a tendency to loosen, particularly because of the strains encountered by flexing the temples and wiping the glasses, vibrations due to walking, and the like, it is impossible to obtain this desired result; for to maintain the lenses in the prescribed position; it is necessary that the screws 12 shall continue to hold the assembled parts firmly together, without loosening.

The invention may, of course, be used elsewhere than in ophthalmic mountings, and for other purposes than to hold the end pieces 4 and 6 together, as illustrated and described in the said copending application, Serial No. 683,323.

These screws 12 have very short, threaded portions; say, about four or five threads long, or about ninety to the inch. The depth of the hereinafter-mentioned aperture 42 is in the neighborhood of thirty thousandths of an inch. The diameter of these screws is only about forty-five thousandths of an inch, so that the diameter of the aperture 42 may be about twenty thousandths of an inch.

The minute size of the screws 12 used in these ophthalmic mountings is an important factor to be considered. The smallness of the screw diameter, the shortness of the threaded portion, and the speed at which the screws 12 are produced, resulting in variations from cylindrical shape, as hereinafter explained, all play their role in reducing the permanency of the holding power that may be expected of these minute, threaded members. While the defects are of such a nature as to be visible only under magnification, so that it becomes necessary, for illustrative purposes, to exaggerate the drawings, they are nevertheless the prime causes of the said loosening.

The difficulties attendant upon such loosened screws have been appreciated for nearly a century of American spectacle-ware making, and many and various methods and proposals for curing the evils have been made, and actually tried in practice, but the prior proposals have all been discarded, for the desired results had not, up to time of the inventions disclosed in the said applications, been attained. The conditions peculiar to the making and wearing of ophthalmic mountings have not been conducive to the practical production of an efficient, economical, and practical screw lock. Recognizing this fact, indeed, some proposals have involved the elimination of the screws altogether; but as the use of screws seems to be essential, the bothersome and sometimes injurious effects of the invariably loosened binding screws (that are supposed to bind) has continued unremedied.

According to the inventions disclosed in the said applications, prior-art defects are remedied by slightly changing the structure of the screw 12, and properly locking it in place. The screw 12 is provided, at its threaded end, with a preferably cylindrical aperture 42 that extends centrally along, or parallel to, the axis, or longitudinally of the screw 12. A continuous, annular, exteriorly threaded wall 44 is thus formed about the aperture 42.

An aperture 42 that would extend throughout the length of the small-diameter screw 12 would weaken the screw. To drill such a continuous-length aperture in such a screw would be impracticable and, furthermore, would require the use of drills of so weak a nature as to involve large breakage, with consequent increased expense. Preferably, therefore, the length of the aperture 42 is about the same as the length along which the screw threads extend, and the aperture is located in the neighborhood of these screw threads, as shown. The use of the tapered mandrel 46 described in the said application, Serial No. 722,092, makes it possible to employ a shorter aperture 42 than would be required with a cylindrical mandrel, though the advantages of the present invention may be attained with either type of mandrel, cylindrical mandrels being shown in Figs. 3, 4 and 7 to 9.

The operation described in the said applications is exceedingly simple and most effective. With the parts assembled, and the threaded members threaded together, as shown, for example, in Fig. 3, a jaw 82 is positioned against the head 18 of the screw 12, and the swaging mandrel 46 is now driven into the aperture 42. A force is thus exerted against the annular wall 44 of the aperture 42, toward the supporting jaw 82, resulting in expanding the continuous, annular wall 44 preferably in all directions radially outward from the axis of the screw 12, but without breaking the continuity of the annular wall 44. The annular wall 44 thus becomes swaged into tight engagement with the wall of the threaded, cylindrical opening 16 to cause the exterior threads of the screw 12 throughout substantially the said length along which the screw threads extend, to lock frictionally against the interior threads of the opening 16. As the continuity of the annular wall is not broken, the external threads of the annular wall remain in tight, frictional engagement with the internal threads of the walls of the opening 16, by reason of the inherent resiliency of the metal of which the screw 12 is made, without splitting the annular wall and without relying upon outside, supplementary holding-member aids to hold the annular wall in place. The mandrel 46 may be withdrawn and the aperture 42 left entirely empty, without the use of a plug in the continuous, expanded aperture 42; yet, owing to the relatively light strains encountered in ophthalmic mountings, a very effective, non-loosening joint is thus provided, that requires considerable force to produce the integral, circular expansion, and that resists compression and consequent loosening to a remarkable degree.

According to the present invention, a more intense locking action is produced in one or more regions, longitudinal of the aperture 42, than in other regions. If the mandrel is oval in cross section, for example, as in Figs. 4 to 6, the more intense locking regions will be at the sharper ends of the oval, shown at 93 in Fig. 6. If the mandrel is triangular in cross section, as in Figs. 7, 10 and 13, the more intense locking region will be at the vertices 95 of the triangle. If the mandrel is square in cross section, as in Figs. 8, 11 and 14, the more intense locking regions will be at the corners 97 of the square. If the mandrel has any other irregular shape, typified by Figs. 9, 12 and 15, the corresponding regions of more intense locking will be the sharper or convex parts 99 of the irregular shape.

The showing is, of course, considerably exaggerated, for clearness.

The screws 12 and the like that are employed in ophthalmic mountings are of such very small dimension, as indicated above, that they present very weak resistive forces to the action of the tools that cut the threads thereon. The resistive force is particularly weak at the extreme, free end 60 of the screw 12, and increases with the distance from the said free end 60 inward toward the screw head 18. The said thread-cutting tools consequently act to reduce the diameter of the screw 12 more at the said free end 60 than along the body thereof, producing a more or less tapering effect in these members near the free end 60. This reduction in diameter near the free end 60 is particularly noticeable at the tops of the threads, as is illustrated in exaggerated form by Fig. 16, where the first convolution 62 of the thread is shown spaced from the dotted lines 64 that represent the original cylindrical body, before the threads were cut therein, this portion being originally of the same diameter as the unthreaded portion 68, adjacent to the head 18. The next convolution 70 is likewise shown spaced from the dotted-line cylinder 64, but not quite so far as the first convolution 60. The third convolution 72 is still closer to the dotted line 64, and the fourth convolution 74 is closer still. The fifth convolution 76, finally, is of about the same diameter as the cylinder 64 and the same would probably be true of subsequent thread convolutions. The first four convolutions 62, 70, 72 and 74, however, render the extreme, free end 60 of the screw 12 progressively tapered or conical.

If the mandrel 46 were cylindrical, therefore, and if the apertures 42 were also cylindrical, the mandrel would expand these first four thread convolutions 62, 70, 72 and 74 against the threaded wall of the opening 16 with less pressure than the fifth convolution 76 and subsequent thread convolutions, if there were any. Not only that, but the degree of pressure with which the threads 62, 70, 72 and 74 bear upon the wall of the opening 16 would be successively less and less in the direction toward the free end 60 of the screw 12. If the screw 12 were of substantial length, this would not be serious, for the remaining thread convolutions could be relied upon to hold the parts effectively together. Such considerations do not apply, however, where the screw-thread convolutions are so few in number that every thread convolution must be relied upon to carry its share of the holding power required to hold the parts together. One reason why ophthalmic mounting screws loosen so frequently, in fact, is because, the screws being so short, so few of the already few threads, owing to the said unavoidable taper, exert any real binding engagement against the cooperating, internal threads into which they are threaded.

According to the invention of the said application, Serial No. 722,092, therefore, provision is made for compensating for this variation in the diameter of the screw-threaded member 12 by producing a greater degree of expansion near the free end 60 of the screw 12 than at other points, and for gradually decreasing the degree of expansion in a direction from the said free end 60 toward the head 18 of the screw 12. This compensating effect is produced by using a tapering mandrel 46, the small end of the taper being at the free end of the mandrel, as illustrated. When a mandrel of this shape is driven home, as illustrated in Figs. 5 and 10 to 12, the convolutions 62, 70, 72 and 74 will all be expanded against the walls of the threaded opening 16 so as to bear thereagainst with approximately uniform holding action. If anything, indeed, the holding action of the thread convolutions near the free end 60 of the screw 12 will be greater than that of the threads farther away. This controlled frictional increase between the threads of the screw 12 and the walls of the threaded opening 16 is an important feature of the present invention. Another is the diameter of the longitudinal recess or aperture 42 in relation to the diameter of the screw 12.

The compensating mandrel 46, intended for the entrance and expansion of the aperture 42, may be mounted on one jaw 78 of a hand tool 80; and the cooperating supporting anvil 82 for the head 18 of the screw on the other jaw 84, as illustrated in Fig. 3, the mandrel 46 and the anvil 82 being in alinement. The head 18 of the screw 12 is engaged by the anvil 82, as before described, and the mandrel 46 is driven home into the aperture 42 by progressively pivoting the jaws 78 and 84 toward each other, about a pivot 86. The degree of compressive drive of the mandrel 46 may be controlled by pivoting the jaws 78 and 84 towards each other to a greater or less degree, as desired. A reverse movement of the handles 88 and 90 of the tool will effect withdrawal of the mandrel 46.

By varying the degree of pressure applied by the hand to the handles 88 and 90 of the hand tool 80, when a tapering mandrel is employed, or by varying the diameter of a cylindrical mandrel, it is possible to obtain practically any desired degree of uniform, frictional engagement, depending upon the use to which the joint is to be put. The more nearly cylindrical the screw-threaded member 12 is, the less will be the range of expansion of the wall 44 that may be required.

The contacting end of the supporting anvil 82 is shown slightly smaller in diameter than the diameter of the screw head 18 against which it functions. This ensures that the head 18 shall, at all times, contact with the anvil 82 when the mandrel 46 is engaged in its expansion of the walls of the aperture 42. The double contact thus produced at opposite ends of the screw 12 ensures a completely controlled, radial expansion. To obtain a controlled, even, radial expansion, it is desirable that the pressure should be applied to both ends of the screw 12 at one and the same time, else there might be an endwise crowding of the screw against the threads of the opening 16, instead of the desired expansion.

If, for example, the countersink 20 were deeper than the thickness of the screw head 18, and if the diameter of the anvil 82 were greater than that of the screw head 18, there would then be a vacancy between them, or a gap, at the point marked 91 in Fig. 4. The downward drive of the mandrel 46, against the walls of the aperture 42, might then, owing to the small dimensions above described, result in the screw 12 being forced downward to fill this vacancy or gap. Instead of the desired, controlled expansion, there would be an uncontrolled upsetting action of the threads.

The present invention provides an effective lock against accidental loosening of the screw-threaded members, both ends of which are exposed to view, and without disfiguring the final product, for an article, like an ophthalmic mounting, that is worn on the face, must have an attractive appearance.

Notwithstanding the effectiveness of the lock of the present invention, the screw 12 may, however, be readily unscrewed in case of need, as to replace a broken lens, and either the same screw 12 or another screw 12 may be reinserted and relocked in place, for the locking process of the present invention does not injure either the screw-threaded member itself, or the parts in which it is locked.

It will be understood that the dimensions above given are for illustrative purposes, and that, in any particular case, they may be varied to suit such particular case. The depth and diameter of the aperture 42, for example, should be such as will produce the desired radial expansion for the particular purpose in hand.

Modifications will occur to persons skilled in the art, and all such are intended to be included within the scope of the appended claims.

What is claimed is:

1. A method of locking a relatively small-dimensioned, light, substantially cylindrical, metal member exteriorly threaded at one end in an ophthalmic mounting comprising a part of relatively light material having a threaded, substantially cylindrical opening in which the exteriorly threaded member is threaded, the said method comprising providing the exteriorly threaded member with an aperture substantially parallel to the axis of the cylinder extending from said end inward toward the other end of the member in the neighborhood of the exterior threads so as to form a continuous, annular, exteriorly threaded wall, pressing a mandrel into the aperture to expand the continuous, annular wall radially outward, but with a greater expanding force at one region disposed longitudinally of the aperture than at other longitudinally disposed regions, and without breaking the continuity of the annular wall, to swage the annular wall into tight engagement with the threaded wall of the cylindrical opening along a region extending from one end of the cylindrical opening a substantial distance into the cylindrical opening to cause the exterior threads upon the annular wall to lock frictionally against the threads of the cylindrical opening, and removing the mandrel from the aperture, the material and the dimensions of the member being such as to cause the exterior threads upon the annular wall to lock frictionally against the threads of the cylindrical opening by the inherent resiliency of the swaged metal without the aid of a locking plug permanently positioned in the aperture.

2. A method of locking a relatively small-dimensioned, light, exteriorly threaded, substantially cylindrical, metal member the free end of which is slightly tapered, with a substantial portion of the threads disposed at the said free end, in an ophthalmic mounting comprising a part of relatively light material having a threaded, substantially cylindrical opening in which the exteriorly threaded member is threaded, the said method comprising providing the exteriorly threaded member with an aperture substantially parallel to the axis of the cylinder in the neighborhood of the exterior threads so as to form a continuous, annular, exteriorly threaded wall, pressing a mandrel into the aperture to expand the continuous, annular wall radially outward, but with a greater expanding force at one region disposed longitudinally of the aperture than at other longitudinally disposed regions, and without breaking the continuity of the annular wall, and with a greater expanding force at the said free end than at other parts of the said exteriorly threaded member, to swage the annular wall into tight engagement with the threaded wall of the cylindrical opening along a region extending from one end of the cylindrical opening a substantial distance into the cylindrical opening to cause the exterior threads upon the annular wall to lock frictionally against the threads of the cylindrical opening, and removing the mandrel from the aperture, the material and the dimensions of the member being such as to cause the exterior threads upon the annular wall to lock frictionally against the threads of the cylindrical opening by the inherent resiliency of the swaged metal without the aid of a locking plug permanently positioned in the aperture.

3. A method of locking in a threaded opening of an ophthalmic mounting a relatively small-dimensioned, light, metal member provided at one end thereof with a very few exterior threads comprising providing the said end with an aperture so as to form a continuous, annular, exteriorly threaded wall, supporting the other end of the member, pressing a mandrel into the aperture to exert pressure upon the continuous, annular wall of the aperture toward the supported end and radially outward to expand the continuous, annular wall radially outward, but with a greater expanding force at one region disposed longitudinally of the aperture than at other longitudinally disposed regions, and without breaking the continuity of the annular wall, to swage the annular wall into tight engagement with the threaded wall of the threaded opening along a region extending from one end of the threaded opening a substantial distance into the threaded opening to cause the exterior threads upon the annular wall to lock frictionally against the threads of the threaded opening, and removing the mandrel from the aperture, the material and the dimensions of the member being such as to cause the exterior threads upon the annular wall to lock frictionally against the threads of the threaded opening by the inherent resiliency of the swaged metal without the aid of a locking plug permanently positioned in the aperture.

4. A method of locking a relatively small-dimensioned, light, exteriorly threaded, substantially cylindrical, metal member the free end of which is slightly tapered, with a substantial portion of the threads disposed at the said free end, in an ophthalmic mounting comprising a part of relatively light material having a threaded, substantially cylindrical opening in which the exteriorly threaded member is threaded, the said method comprising providing the exteriorly threaded member with an aperture substantially parallel to the axis of the cylinder in the neighborhood of the exterior threads so as to form a continuous, annular, exteriorly threaded wall, supporting the other end of the member, pressing a mandrel into the aperture to exert pressure upon the continuous, annular wall of the aperture from the said free end toward the supported end and radially outward to expand the continuous, annular wall radially outward, without breaking the continuity of the annular wall, but with a greater expanding force at the said free end than at other parts of the said exteriorly threaded member, to swage the annular wall into tight engagement with the threaded wall of the cylindrical opening, and removing the mandrel from the aperture, the material and the dimensions of the member being such as to cause the exterior threads upon the annular wall to lock frictionally against the threads of the cylindrical opening by the inherent resiliency of the swaged metal without the aid of a locking plug permanently positioned in the aperture.

5. An ophthalmic mounting comprising a part of relatively light material having a threaded, substantially cylindrical opening, and a relatively small-dimensioned, light, substantially cylindrical, metal member exteriorly threaded at one end and threaded in the threaded opening with said end substantially flush with a face of the said part, the member having a longitudinally extending aperture substantially parallel to the axis of the cylinder extending from said end inward toward the other end of the member in the neighborhood of the exterior threads so as to form a continuous, annular, exteriorly threaded wall, the continuous, annular wall being swaged by expansion radially outward, but with a greater degree of expansion at one region disposed longitudinally of the aperture than at other longitudinally disposed regions, and without breaking the continuity of the annular wall, into tight engagement with the threaded wall of the cylindrical opening along a region extending from the end of the cylindrical opening near the said face a substantial distance into the cylindrical opening, the material and the dimensions of the member being such as to cause the exterior threads upon the annular wall to lock frictionally against the threads of the cylindrical opening by the inherent resiliency of the swaged metal without the aid of a locking plug permanently positioned in the aperture.

6. An ophthalmic mounting comprising two end pieces of relatively light material, one of the end pieces having an opening communicating with a countersink, the other end piece having a threaded, substantially cylindrical opening alined with the first-named opening, and a relatively small-dimensioned, light, substantially cylindrical, headed, metal screw disposed in the first-named opening, with the head of the screw in the countersink and the threads of the screw threaded in the threaded opening and with the threaded end of the screw substantially flush with a face of the said other end piece, the screw having a longitudinally extending aperture substantially parallel to the axis of the screw extending from the threaded end of the screw inward toward the head of the screw, so as to form a continuous, annular, exteriorly threaded wall, the continuous, annular wall being swaged by expansion radially outward, but with a greater degree of expansion at one region disposed longitudinally of the aperture than at other longitudinally disposed regions, and without breaking the continuity of the annular wall, into tight engagement with the wall of the cylindrical opening along a region extending from the end of the cylindrical opening near the said face a substantial distance into the cylindrical opening, but with a greater degree of expansion at the said one region than at other regions, the material and the dimensions of the screw being such as to cause the threads of the screw to lock frictionally against the threads of the cylindrical opening along the said region by the inherent resiliency of the swaged metal without the aid of a locking plug permanently positioned in the aperture.

FREDERICK A. STEVENS.